United States Patent
Ho et al.

(10) Patent No.: US 10,091,500 B2
(45) Date of Patent: Oct. 2, 2018

(54) VIDEO CODING METHOD USING AT LEAST EVALUATED VISUAL QUALITY AND RELATED VIDEO CODING APPARATUS

(71) Applicant: MEDIATEK INC., Hsinchu (TW)

(72) Inventors: Cheng-Tsai Ho, Taichung (TW); Chi-Cheng Ju, Hsinchu (TW); Ding-Yun Chen, Taipei (TW)

(73) Assignee: MEDIATEK INC., Hsinchu (TW)

( * ) Notice: Subject to any disclaimer, the term of this patent is extended or adjusted under 35 U.S.C. 154(b) by 68 days.

(21) Appl. No.: 14/194,812

(22) Filed: Mar. 2, 2014

(65) Prior Publication Data
US 2014/0254680 A1 Sep. 11, 2014

Related U.S. Application Data

(60) Provisional application No. 61/776,053, filed on Mar. 11, 2013.

(51) Int. Cl.
*H04N 19/154* (2014.01)
*H04N 19/117* (2014.01)
(Continued)

(52) U.S. Cl.
CPC ..... *H04N 19/00066* (2013.01); *H04N 19/117* (2014.11); *H04N 19/154* (2014.11);
(Continued)

(58) Field of Classification Search
CPC ........... H04N 19/00066; H04N 19/117; H04N 19/154; H04N 19/18; H04N 19/196; H04N 19/46; H04N 19/82; H04N 19/147
(Continued)

(56) References Cited

U.S. PATENT DOCUMENTS

| 6,160,846 A | 12/2000 | Chiang |
| 6,233,283 B1 * | 5/2001 | Chiu ..................... H04N 21/643 375/240.14 |

(Continued)

FOREIGN PATENT DOCUMENTS

| CN | 1471319 A | 1/2004 |
| CN | 1669338 A | 9/2005 |

(Continued)

OTHER PUBLICATIONS

"International Search Report" dated Jun. 30, 2014 for International application No. PCT/CN2014/073176, International filing date:Mar. 11, 2014.

(Continued)

*Primary Examiner* — Behrooz Senfi
(74) *Attorney, Agent, or Firm* — Oblon, McClelland, Maier & Neustadt, L.L.P.

(57) ABSTRACT

One video coding method includes at least the following steps: utilizing a visual quality evaluation module for evaluating visual quality based on data involved in a coding loop; and referring to at least the evaluated visual quality for performing motion estimation. Another video coding method includes at least the following steps: utilizing a visual quality evaluation module for evaluating visual quality based on data involved in a coding loop; and referring to at least the evaluated visual quality for deciding a target coding parameter associated with motion estimation.

21 Claims, 5 Drawing Sheets

(51) Int. Cl.
*H04N 19/196* (2014.01)
*H04N 19/82* (2014.01)
*H04N 19/147* (2014.01)
*H04N 19/46* (2014.01)
*H04N 19/18* (2014.01)

(52) U.S. Cl.
CPC .......... *H04N 19/196* (2014.11); *H04N 19/82* (2014.11); *H04N 19/18* (2014.11); *H04N 19/46* (2014.11)

(58) Field of Classification Search
USPC ........................................ 375/240.26, 240.16
See application file for complete search history.

(56) References Cited

U.S. PATENT DOCUMENTS

| | | | |
|---|---|---|---|
| 7,742,532 B2 | 6/2010 | Jeon | |
| 7,873,727 B2 | 1/2011 | Pal | |
| 8,077,775 B2 | 12/2011 | He | |
| 8,111,300 B2 * | 2/2012 | Hwang | G06T 5/50 348/208.14 |
| 8,345,777 B2 | 1/2013 | Lee | |
| 9,282,328 B2 | 3/2016 | Chen | |
| 2003/0128754 A1 * | 7/2003 | Akimoto | H04N 19/25 375/240.02 |
| 2003/0206587 A1 | 11/2003 | Gomila | |
| 2003/0206664 A1 | 11/2003 | Gomila | |
| 2004/0114817 A1 | 6/2004 | Jayant | |
| 2004/0156559 A1 | 8/2004 | Cheng | |
| 2004/0208392 A1 | 10/2004 | Raveendran | |
| 2005/0243915 A1 | 11/2005 | Kwon | |
| 2006/0114997 A1 | 6/2006 | Lelescu | |
| 2006/0215766 A1 | 9/2006 | Wang | |
| 2006/0238445 A1 | 10/2006 | Wang | |
| 2008/0069247 A1 | 3/2008 | He | |
| 2008/0117981 A1 | 5/2008 | Lee | |
| 2008/0240252 A1 * | 10/2008 | He | H04N 19/176 375/240.24 |
| 2009/0323803 A1 | 12/2009 | Gomila | |
| 2010/0220796 A1 | 9/2010 | Yin | |
| 2010/0296588 A1 | 11/2010 | Fujii | |
| 2011/0033119 A1 | 2/2011 | Rezazadeh | |
| 2011/0211637 A1 * | 9/2011 | Blum | H04N 19/147 375/240.16 |
| 2011/0222607 A1 | 9/2011 | An | |
| 2011/0235715 A1 * | 9/2011 | Chien | H04N 19/176 375/240.16 |
| 2011/0255589 A1 | 10/2011 | Saunders | |
| 2011/0280321 A1 | 11/2011 | Chou | |
| 2011/0293012 A1 * | 12/2011 | Au | H04N 19/52 375/240.16 |
| 2011/0310295 A1 * | 12/2011 | Chen | H04N 19/577 348/441 |
| 2012/0082241 A1 | 4/2012 | Tsai | |
| 2012/0163452 A1 | 6/2012 | Horowitz | |
| 2012/0177104 A1 | 7/2012 | Budagavi | |
| 2012/0201475 A1 | 8/2012 | Carmel | |
| 2012/0257681 A1 | 10/2012 | Sato | |
| 2012/0328004 A1 | 12/2012 | Coban | |
| 2012/0328029 A1 | 12/2012 | Sadafale | |
| 2013/0051454 A1 | 2/2013 | Sze | |
| 2013/0051455 A1 | 2/2013 | Sze | |
| 2013/0077871 A1 * | 3/2013 | Lu | G06K 9/36 382/197 |
| 2013/0083844 A1 | 4/2013 | Chong | |
| 2013/0094569 A1 | 4/2013 | Chong | |
| 2013/0094572 A1 | 4/2013 | Van der Auwera | |
| 2013/0177068 A1 | 7/2013 | Minoo | |
| 2013/0243090 A1 * | 9/2013 | Li | H04N 19/56 375/240.16 |
| 2013/0318253 A1 | 11/2013 | Kordasiewicz | |
| 2013/0343447 A1 | 12/2013 | Chen | |
| 2014/0002670 A1 * | 1/2014 | Kolarov | H04N 17/004 348/180 |
| 2014/0056363 A1 | 2/2014 | He | |
| 2014/0160239 A1 | 6/2014 | Tian | |
| 2014/0254659 A1 * | 9/2014 | Ho | H04N 19/00066 375/240.02 |
| 2014/0254662 A1 * | 9/2014 | Ho | H04N 19/00066 375/240.03 |
| 2014/0254663 A1 * | 9/2014 | Ho | H04N 19/00066 375/240.05 |
| 2014/0254680 A1 * | 9/2014 | Ho | H04N 19/00066 375/240.16 |
| 2014/0254689 A1 * | 9/2014 | Ho | H04N 19/00066 375/240.26 |
| 2014/0321552 A1 * | 10/2014 | He | H04N 19/00909 375/240.16 |
| 2014/0334559 A1 | 11/2014 | Kim | |
| 2016/0044332 A1 * | 2/2016 | Maaninen | H04N 19/513 375/240.16 |
| 2017/0208223 A1 * | 7/2017 | Laroche | H04N 5/145 |

FOREIGN PATENT DOCUMENTS

| | | |
|---|---|---|
| CN | 1694500 A | 11/2005 |
| CN | 1695164 A | 11/2005 |
| CN | 101090502 A | 12/2007 |
| CN | 101164342 A | 4/2008 |
| CN | 101232619 A | 7/2008 |
| CN | 101325711 A | 12/2008 |
| CN | 100452883 C | 1/2009 |
| CN | 101489130 A | 7/2009 |
| CN | 102150427 A | 8/2011 |
| CN | 102150429 A | 8/2011 |
| CN | 102415088 A | 4/2012 |
| CN | 102685472 A | 9/2012 |
| TW | 201134223 A1 | 10/2011 |
| WO | 2013030833 A1 | 3/2013 |
| WO | 2013074365 A1 | 5/2013 |

OTHER PUBLICATIONS

"International Search Report" dated Jun. 13, 2014 for International application No. PCT/CN2014/073171, International filing date:Mar. 11, 2014.

"International Search Report" dated Jun. 23, 2014 for International application No. PCT/CN2014/073146, International filing date:Mar. 10, 2014.

"International Search Report" dated Jun. 3, 2014 for International application No. PCT/CN2014/073178, International filing date:Mar. 11, 2014.

"International Search Report" dated Jun. 18, 2014 for International application No. PCT/CN2014/073167, International filing date:Mar. 11, 2014.

Chikkerur et al., "Objective Video Quality Assessment Methods: A Classification, Review, and Performance Comparison", IEEE Transactions on Broadcasting, vol. 57, No. 2, Jun. 2011, p. 165-182.

Chih-Ming Fu et al., "Sample Adaptive Offest for HEVC", 2011 IEEE.

\* cited by examiner

VIDEO CODING METHOD USING AT LEAST EVALUATED VISUAL QUALITY AND RELATED VIDEO CODING APPARATUS

CROSS REFERENCE TO RELATED APPLICATIONS

This application claims the benefit of U.S. provisional application No. 61/776,053, filed on Mar. 11, 2013 and incorporated herein by reference.

BACKGROUND

The disclosed embodiments of the present invention relate to video coding, and more particularly, to a video coding method using at least evaluated visual quality determined by one or more visual quality metrics and a related video coding apparatus.

The conventional video coding standards generally adopt a block based (or coding unit based) coding technique to exploit spatial redundancy. For example, the basic approach is to divide the whole source frame into a plurality of blocks (coding units), perform prediction on each block (coding unit), transform residues of each block (coding unit) using discrete cosine transform, and perform quantization and entropy encoding. Besides, a reconstructed frame is generated in a coding loop to provide reference pixel data used for coding following blocks (coding units). For certain video coding standards, in-loop filter(s) may be used for enhancing the image quality of the reconstructed frame. For example, a de-blocking filter is included in an H.264 coding loop, and a de-blocking filter and a sample adaptive offset (SAO) filter are included in an HEVC (High Efficiency Video Coding) coding loop.

Generally speaking, the coding loop is composed of a plurality of processing stages, including transform, quantization, intra/inter prediction, etc. Based on the conventional video coding standards, one processing stage selects a video coding mode based on pixel-based distortion value derived from a source frame (i.e., an input frame to be encoded) and a reference frame (i.e., a reconstructed frame generated during the coding procedure). For example, the pixel-based distortion value may be a sum of absolute differences (SAD), a sum of transformed differences (SATD), or a sum of square differences (SSD). However, the pixel-based distortion value merely considers pixel value differences between pixels of the source frame and the reference frame, and sometimes is not correlated to the actual visual quality of a reconstructed frame generated from decoding an encoded frame. Specifically, based on experimental results, different processed images, each derived from an original image and having the same pixel-based distortion (e.g., the same mean square error (MSE)) with respect to the original image, may present different visual quality to a viewer. That is, the smaller pixel-based distortion does not mean better visual quality in the human visual system. Hence, an encoded frame generated based on video coding modes each selected due to a smallest pixel-based distortion value does not guarantee that a reconstructed frame generated from decoding the encoded frame would have the best visual quality.

SUMMARY

In accordance with exemplary embodiments of the present invention, a video coding method using at least evaluated visual quality obtained by one or more visual quality metrics and a related video coding apparatus are proposed.

According to a first aspect of the present invention, an exemplary video coding method is disclosed. The exemplary video coding method includes: utilizing a visual quality evaluation module for evaluating visual quality based on data involved in a coding loop; and referring to at least the evaluated visual quality for performing motion estimation.

According to a second aspect of the present invention, another exemplary video coding method is disclosed. The exemplary video coding method includes: utilizing a visual quality evaluation module for evaluating visual quality based on data involved in a coding loop; and referring to at least the evaluated visual quality for deciding a target coding parameter associated with motion estimation.

According to a third aspect of the present invention, an exemplary video coding apparatus is disclosed. The exemplary video coding apparatus includes a visual quality evaluation module and a coding circuit. The visual quality evaluation module is arranged to evaluate visual quality based on data involved in a coding loop. The coding circuit has the coding loop included therein, and is arranged to refer to at least the evaluated visual quality for performing motion estimation.

According to a fourth aspect of the present invention, another exemplary video coding apparatus is disclosed. The exemplary video coding apparatus includes a visual quality evaluation module and a coding circuit. The visual quality evaluation module is arranged to evaluate visual quality based on data involved in a coding loop. The coding circuit has the coding loop included therein, and is arranged to refer to at least the evaluated visual quality for deciding a target coding parameter associated with motion estimation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to incorporate characteristics of a human visual system into a video coding procedure to improve the video compression efficiency or visual quality. More specifically, visual quality evaluation is involved in the video coding procedure such that a reconstructed frame generated from decoding an encoded frame is capable of having enhanced visual quality. Further details of the proposed visual quality based video coding design are described as below.

Figure 1:
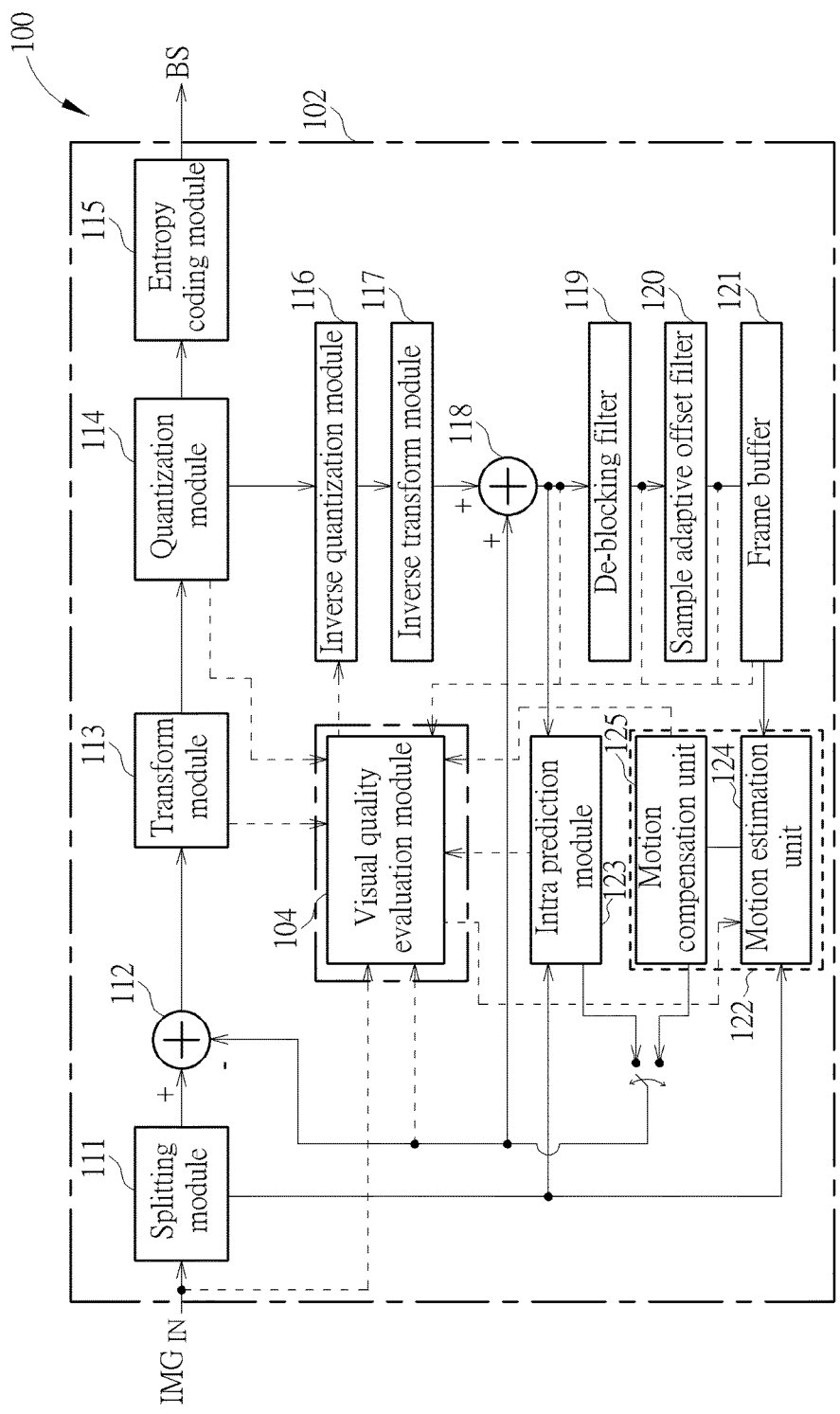
FIG. 1 is a block diagram illustrating a video coding apparatus according to an embodiment of the present invention.

FIG. 1 is a block diagram illustrating a video coding apparatus according to an embodiment of the present invention. The video coding apparatus 100 is used to encode a source frame $IMG_{IN}$ to generate a bitstream BS carrying encoded frame information corresponding to the source frame $IMG_{IN}$. In this embodiment, the video coding apparatus 100 includes a coding circuit 102 and a visual quality evaluation module 104. By way of example, but not limitation, the architecture of the coding circuit 102 may be configured based on any conventional video encoding architecture. It should be noted that the coding circuit 102 may follow the conventional video encoding architecture to have a plurality of processing stages implemented therein; however, this by no means implies that each of the processing stages included in the coding circuit 102 must be implemented using a conventional design. For example, any of the processing stages that is associated with the visual quality evaluation performed by the visual quality evaluation module 104 and/or is affected/controlled by the visual quality obtained by the visual quality evaluation module 104 still falls within the scope of the present invention.

As shown in FIG. 1, the coding circuit 102 includes a coding loop composed of a splitting module 111, a subtractor (i.e., an adder configured to perform a subtraction operation) 112, a transform module 113, a quantization module 114, an inverse quantization module 116, an inverse transform module 117, an adder 118, a de-blocking filter 119, a sample adaptive offset (SAO) filter 120, a frame buffer 121, an inter prediction module 122, and an intra prediction module 123, where the inter prediction module 122 includes a motion estimation unit 124 and a motion compensation unit 125. The coding circuit 102 further includes an entropy coding module 115 arranged to generate the bitstream BS by performing entropy encoding upon quantized coefficients generated from the quantization module 114. It should be noted that one or both of the de-blocking filter 119 and the SAO filter 120 may be omitted/bypassed for certain applications. That is, the de-blocking filter 119 and/or the SAO filter 120 may be optional, depending upon actual design requirement. As a person skilled in the pertinent art should readily understand fundamental operations of the processing stages included in the coding circuit 102, further description is omitted here for brevity. Concerning one or more of the processing stages that are affected/controlled by the visual quality determined by the visual quality evaluation module 104, further description will be given as below.

One key feature of the present invention is using the visual quality evaluation module 104 to evaluate visual quality based on data involved in the coding loop of the coding circuit 102. In one embodiment, the data involved in the coding loop and processed by the visual quality evaluation module 104 may be raw data of the source frame $IMG_{IN}$. In another embodiment, the data involved in the coding loop and processed by the visual quality evaluation module 104 may be processed data derived from raw data of the source frame $IMG_{IN}$. For example, the processed data used to evaluate the visual quality may be transformed coefficients generated by the transform module 113, quantized coefficients generated by the quantization module 114, reconstructed pixel data before the optional de-blocking filter 119, reconstructed pixel data after the optional de-blocking filter 119, reconstructed pixel data before the optional SAO filter 120, reconstructed pixel data after the optional SAO filter 120, reconstructed pixel data stored in the frame buffer 121, motion-compensated pixel data generated by the motion compensation unit 125, or intra-predicted pixel data generated by the intra prediction module 123.

The visual quality evaluation performed by the visual quality evaluation module 104 may calculate one or more visual quality metrics to decide one evaluated visual quality. For example, the evaluated visual quality is derived from checking at least one image characteristic that affects human visual perception, and the at least one image characteristic may include sharpness, noise, blur, edge, dynamic range, blocking artifact, mean intensity (e.g., brightness/luminance), color temperature, scene composition (e.g., landscape, portrait, night scene, etc.), human face, animal presence, image content that attracts more or less interest (e.g., region of interest (ROI)), spatial masking (i.e., human's visual insensitivity of more complex texture), temporal masking (i.e., human's visual insensitivity of high-speed moving object), or frequency masking (i.e., human's visual insensitivity of higher pixel value variation). By way of example, the noise metric may be obtained by calculating an ISO 15739 visual noise value VN, where $VN=\sigma_{L*}+0.852\cdot\sigma_{u*}+0.323\cdot\sigma_{u*}$ Alternatively, the noise metric may be obtained by calculating other visual noise metric, such as an S-CIELAB metric, a vSNR (visual signal-to-noise ratio) metric, or a Keelan NPS (noise power spectrum) based metric. The sharpness/blur metric may be obtained by measuring edge widths. The edge metric may be a ringing metric obtained by measuring ripples or oscillations around edges.

In one exemplary design, the visual quality evaluation module 104 calculates a single visual quality metric (e.g., one of the aforementioned visual quality metrics) according to the data involved in the coding loop of the coding circuit 102, and determines each evaluated visual quality solely based on the single visual quality metric. In other words, one evaluated visual quality may be obtained by referring to a single visual quality metric only.

In another exemplary design, the visual quality evaluation module 104 calculates a plurality of distinct visual quality metrics (e.g., many of the aforementioned visual quality metrics) according to the data involved in the coding loop of the coding circuit 102, and determines each evaluated visual quality based on the distinct visual quality metrics. In other words, one evaluated visual quality may be obtained by referring to a composition of multiple visual quality metrics. For example, the visual quality evaluation module 104 may be configured to assign a plurality of pre-defined weighting factors to multiple visual quality metrics (e.g., a noise metric and a sharpness metric), and decide one evaluated visual quality by a weighted sum derived from the weighting factors and the visual quality metrics. For another example, the visual quality evaluation module 104 may employ a Minkowski equation to determine a plurality of non-linear weighting factors for the distinct visual quality metrics, respectively; and then determine one evaluated visual quality by combining the distinct visual quality metrics according to respective non-linear weighting factors. Specifically, based on the Minkowski equation, the evaluated visual quality $\Delta Q_m$ is calculated using following equation:

$$\Delta Q_m = \left(\sum_i (\Delta Q_i)^{n_m}\right)^{1/n_m},$$

where $$n_m = 1 + 2 \cdot \tanh\left(\frac{(\Delta Q)_{max}}{16.9}\right),$$

$\Delta Q_i$ is derived from each of the distinct visual quality metrics, and 16.9 is a single universal parameter based on psychophysical experiments. For yet another example, the visual quality evaluation module 104 may employ a training-based manner (e.g., a support vector machine (SVM)) to determine a plurality of trained weighting factors for the distinct visual quality metrics, respectively; and then determine one evaluated visual quality by combining the distinct visual quality metrics according to respective trained weighting factors. Specifically, supervised learning models with associated learning algorithms are employed to analyze the distinct visual quality metrics and recognized patterns, and accordingly determine the trained weighting factors.

After the evaluated visual quality is generated by the visual quality evaluation module 104, the evaluated visual quality is referenced by the motion estimation unit 124 to control/configure the operation of motion estimation. Successive video frames may contain the same object (which is still or moving). The motion estimation performed by the motion estimation unit 124 examines the movement of the object in an image sequence to try to obtain a (motion) vector representing the estimated motion of the object. Next, motion compensation performed by the motion compensation unit 125 uses the knowledge of object motion so obtained to achieve data compression. As the evaluated visual quality is involved in making the motion vector decision for motion estimation, the source frame $IMG_{IN}$ is encoded based on characteristics of the human visual system to thereby allow a decoded/reconstructed frame to have enhanced visual quality.

Figure 2:
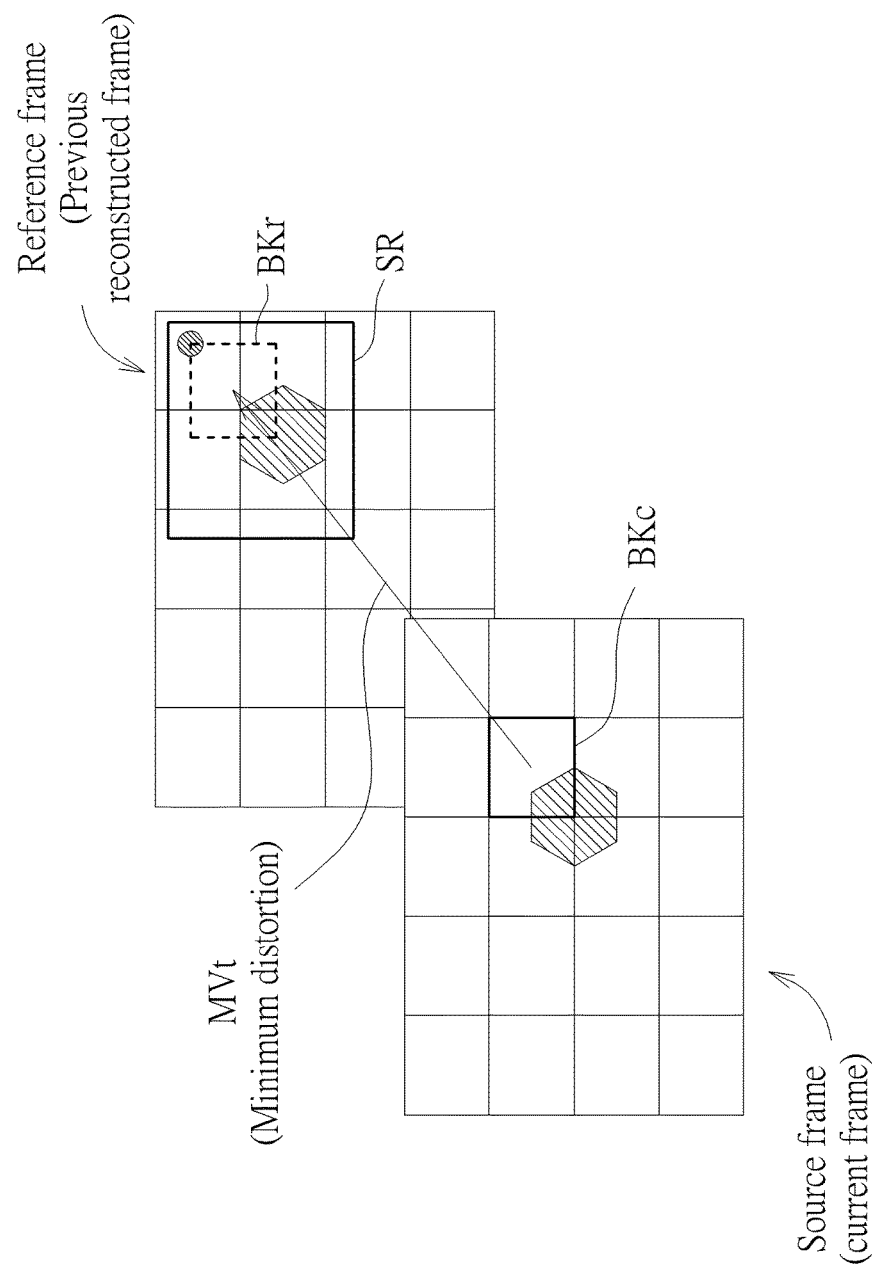
FIG. 2 is a diagram illustrating conventional distortion based motion estimation.
Figure 3:
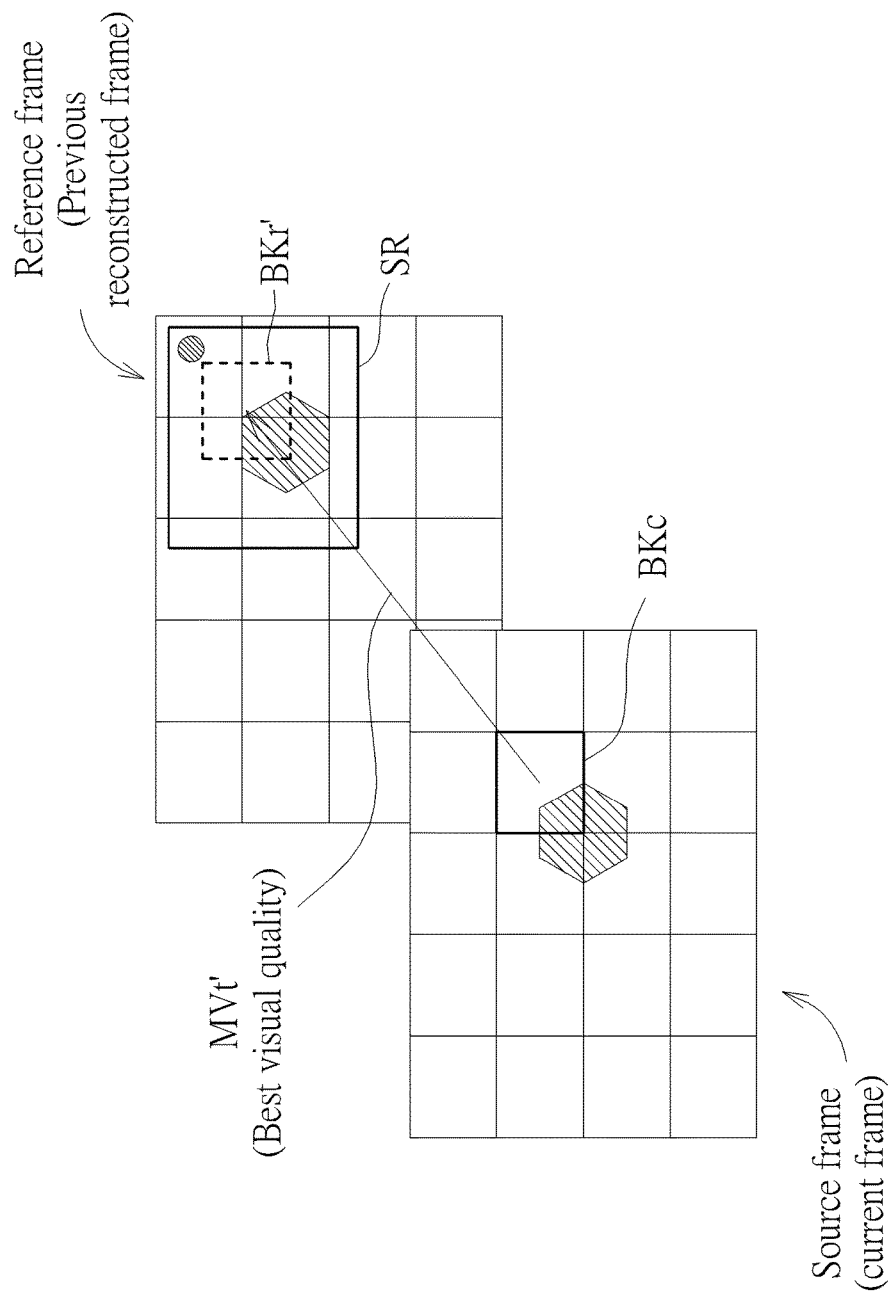
FIG. 3 is a diagram illustrating proposed visual quality based motion estimation according to an embodiment of the present invention.

For example, the motion estimation unit 124 may decide a target motion vector (e.g., a best motion vector) of a current block in the source frame $IMG_{IN}$, where the evaluated visual quality in this case may provide visual quality information for a plurality of candidate motion vectors. Please refer to FIG. 2 in conjunction with FIG. 3. FIG. 2 is a diagram illustrating conventional distortion based motion estimation. FIG. 3 is a diagram illustrating proposed visual quality based motion estimation according to an embodiment of the present invention. To find a best motion vector for a current block BKc in a source frame (e.g., a current frame), all reference blocks in a search range SR within a reference frame (e.g., a previous reconstructed frame) are checked, where there is one candidate motion vector between each reference block and the current block BKc. The conventional video coding design calculates pixel-based distortion value Distortion (C, R) for each reference block in the search range SR, where C represent pixels in a source frame (particularly, pixels of the current block BKc), R represent pixels in a reference frame (particularly, pixels of a reference block), and the distortion value Distortion (C, R) may be an SAD value, an SATD value or an SSD value.

Next, the conventional video coding design decides a best motion vector MVt for the current block BKc by selecting a candidate motion vector with a minimum pixel-based distortion (i.e., $$\min_{All\ reference\ blocks\ in\ search\ range} \{Distortion(C, R)\}).$$

As shown in FIG. 2, the reference block BKr has a minimum pixel-based distortion value, but does not have the best visual quality when used as a predicted block for the current block BKc. In contrast to the conventional video coding design, the present invention proposes using the evaluated visual quality VQ(C or R') derived from data involved in the coding loop of the coding unit 102 to find a best motion vector for the current block BKc, where one evaluated visual quality VQ(C or R') for each reference block in the search range SR may be obtained by a single visual quality metric or a composition of multiple visual quality metrics, C represents raw data of the source frame $IMG_{IN}$ (particularly, pixel data of the current block BKc), and R' represents processed data derived from raw data of the source frame $IMG_{IN}$ (particularly, processed data derived from processing pixel data of the current block BKc and/or reference block BKr' by video coding). Preferably, the motion estimation unit 124 decides a best motion vector MVt' for the current block BKc by selecting a candidate motion vector with best visual quality (i.e., $$\underset{All\ reference\ blocks\ in\ search\ range}{best} \{VQ(C\ or\ R')\}).$$

As shown in FIG. 3, the reference block BKr' may not have a minimum pixel-based distortion value, but has the best visual quality when used as an estimated block for the current block BKc.

In an alternative design, both of the evaluated visual quality (e.g., VQ(C or R')) and the pixel-based distortion (e.g., Distortion (C, R)) are used to decide a best motion vector of a current block in the source image $IMG_{IN}$, where the evaluated visual quality in this case may provide visual quality information for a plurality of candidate motion vectors, and the pixel-based distortion in this case may provide distortion information for a plurality of candidate motion vectors. For example, the motion estimation unit 124 refers to the evaluated visual quality to find a first candidate motion vector (e.g., MVt' shown in FIG. 3), refers to the calculated pixel-based distortion to find a second candidate motion vector (e.g., MVt shown in FIG. 2), and finally selects one of the first candidate motion vector and the second candidate motion vector as the best motion vector for the current block BKc. For another example, the motion estimation unit 124 performs a coarse decision according to one of the evaluated visual quality and the calculated pixel-based distortion to select M coarse candidate motion vectors for the current block BKc from candidate motion vectors corresponding to all of N reference blocks within the search range SR, and performs a fine decision according to another of the evaluated visual quality and the pixel-based distortion to determine P fine candidate motion vectors from the coarse candidate motion vectors (N>M & M>P≥1), wherein a target motion vector (i.e., a best motion vector) for the current block BKc is derived from the P fine candidate motion vectors. In a case where P=1, a best motion vector for the current block BKc is directly determined by the fine decision based on the pixel-based distortion if the coarse decision is made based on the evaluated visual quality; or a best motion vector for the current block BKc is directly determined by the fine decision based on the evaluated visual quality if the coarse decision is made based on the pixel-based distortion.

Figure 4:
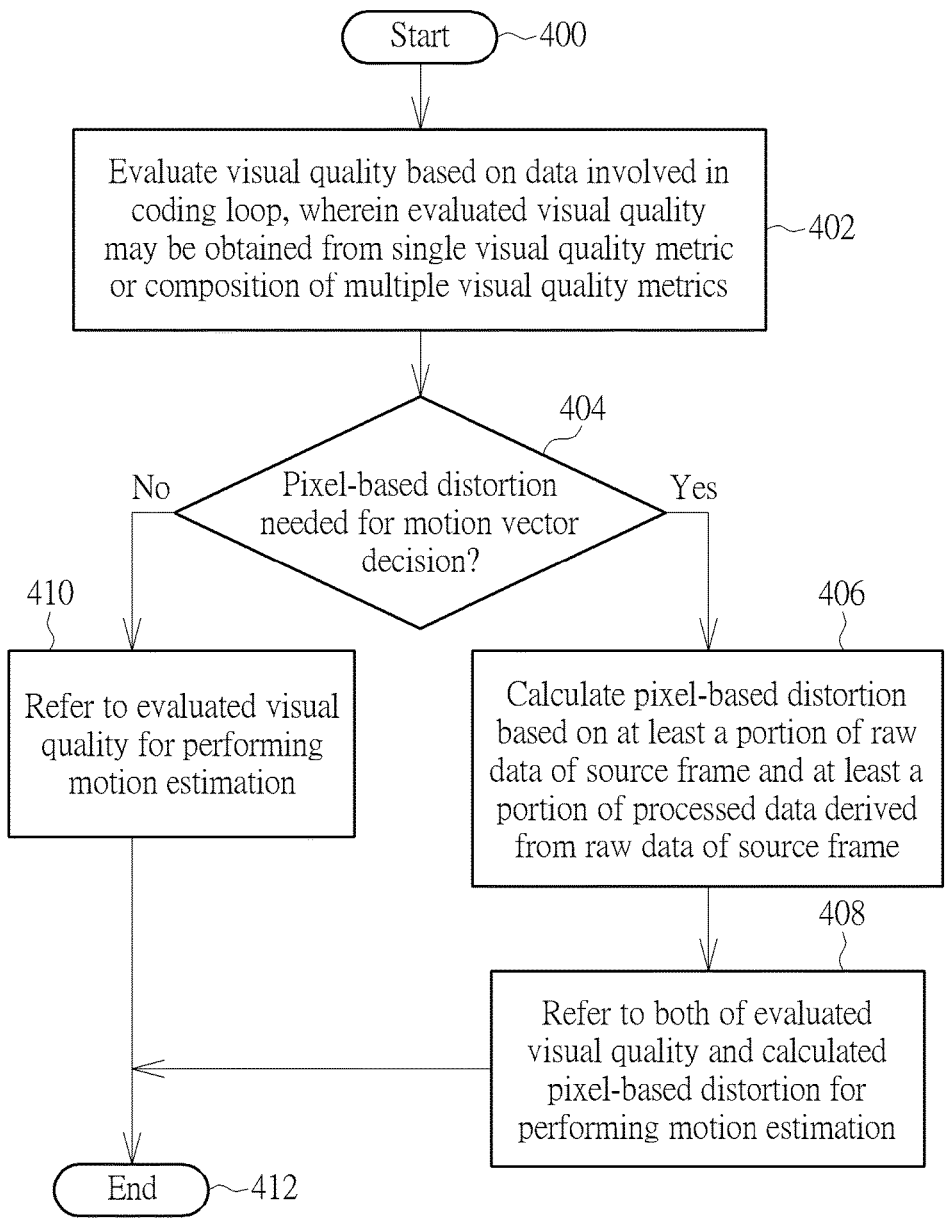
FIG. 4 is a flowchart illustrating a video coding method according to a first embodiment of the present invention.

FIG. 4 is a flowchart illustrating a video coding method according to a first embodiment of the present invention. Provided that the result is substantially the same, the steps are not required to be executed in the exact order shown in FIG. 4. The video coding method may be briefly summarized as below.

Step 400: Start.

Step 402: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 404: Check if pixel-based distortion should be used for motion vector decision. If yes, go to step 406; otherwise, go to step 410.

Step 406: Calculate the pixel-based distortion based on at least a portion (i.e., part or all) of raw data of the source frame and at least a portion (i.e., part or all) of processed data derived from the raw data of the source frame.

Step 408: Refer to both of the evaluated visual quality and the calculated pixel-based distortion for performing motion estimation. For example, both of the evaluated visual quality and the calculated pixel-based distortion may be used for deciding motion vectors for blocks within the source frame. Go to step 412.

Step 410: Refer to the evaluated visual quality for performing motion estimation. For example, the evaluated visual quality may be used for deciding motion vectors for blocks within the source frame.

Step 412: End.

As a person skilled in the art can readily understand details of each step in FIG. 4 after reading above paragraphs, further description is omitted here for brevity.

As mentioned above, the evaluated visual quality determined by the visual quality evaluation module 104 can be referenced by the motion estimation unit 124 during motion estimation. However, this is not meant to be a limitation of the present invention. In a second application, the motion estimation unit 124 may be arranged to refer to the aforementioned visual quality determined by the visual quality evaluation module 104 for deciding a target coding parameter associated with motion estimation, where the evaluated visual quality in this case may provide visual quality information for candidate motion vectors, and the target coding parameter may be a motion vector set. In addition, the target coding parameter set based on the evaluated visual quality may be included in the bitstream BS generated by encoding the source frame $IMG_{IN}$. That is, the target coding parameter is a signaling parameter which is transmitted to a video decoding apparatus to facilitate the decoder-side video processing operation. As the visual quality evaluation performed by the visual quality evaluation module 104 has been detailed above, further description directed to obtaining the evaluated visual quality based on one or more visual quality metrics is omitted here for brevity.

In an alternative design, both of the evaluated visual quality (which is obtained based on data involved in the coding loop) and the pixel-based distortion (which is generated based on at least a portion of raw data of the source frame $IMG_{IN}$ and at least a portion of processed data derived from the raw data of the source frame $IMG_{IN}$) are used to decide a target coding parameter (e.g., a motion vector set) associated with motion estimation, wherein the evaluated visual quality in this case may provide visual quality information for candidate motion vectors, and the calculated pixel-based distortion in this case may provide distortion information for candidate motion vectors. Besides, the target coding parameter set based on the evaluated visual quality and the pixel-based distortion may be included in the bitstream BS and transmitted to a video decoding apparatus.

For example, the motion estimation unit 124 refers to the evaluated visual quality to decide a first parameter setting with best visual quality, refers to the calculated pixel-based distortion to decide a second parameter setting with smallest distortion, and finally selects one of the first parameter setting and the second parameter setting to set the target coding parameter. For another example, the motion estimation unit 124 performs a coarse decision according to one of the evaluated visual quality and the pixel-based distortion to determine a plurality of coarse parameter settings, and performs a fine decision according to another of the evaluated visual quality and the pixel-based distortion to determine at least one fine parameter setting from the coarse parameter settings, wherein the target coding parameter (i.e., the motion vector set) is derived from the at least one fine parameter setting.

Figure 5:
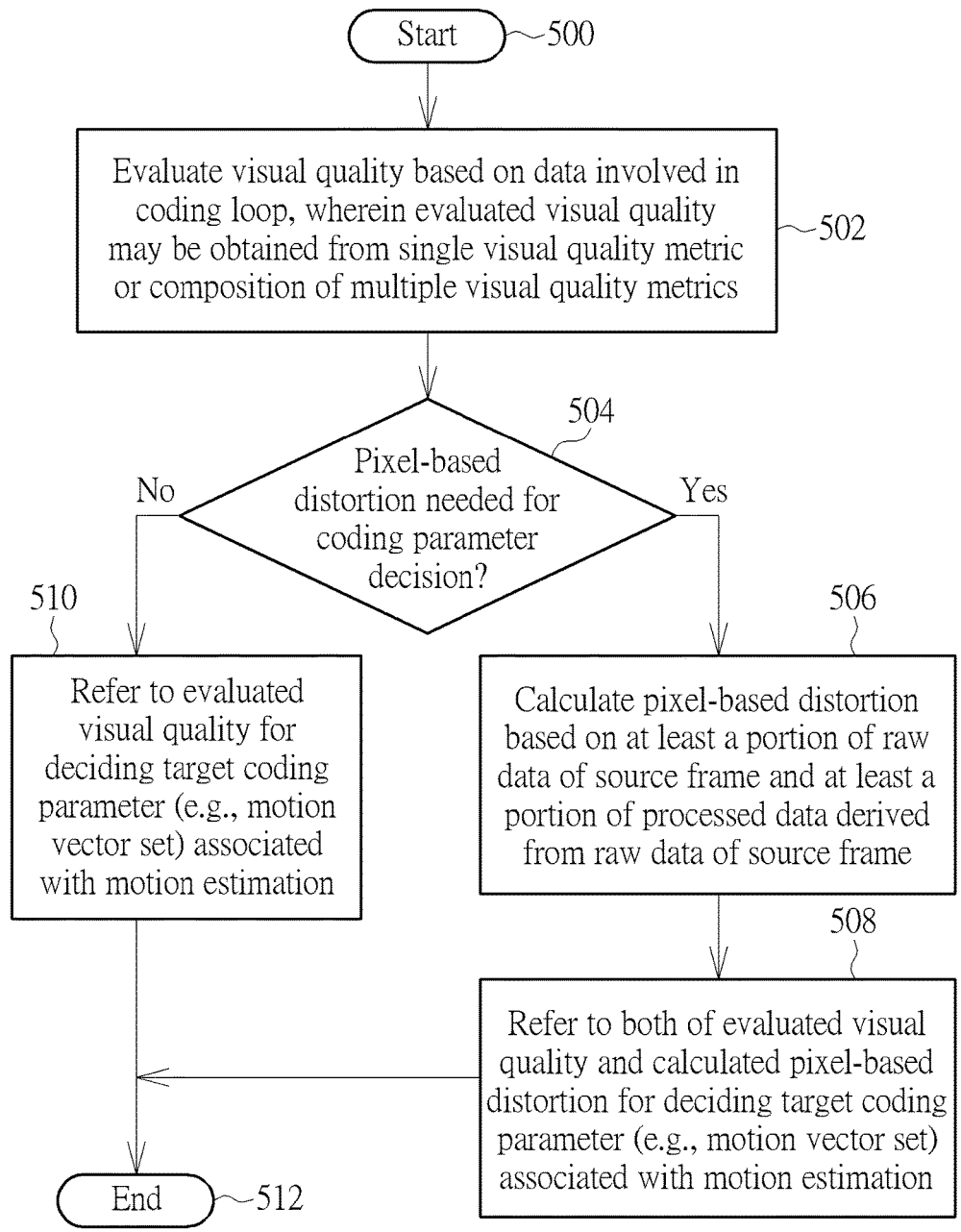
FIG. 5 is a flowchart illustrating a video coding method according to a second embodiment of the present invention.

FIG. 5 is a flowchart illustrating a video coding method according to a second embodiment of the present invention. Provided that the result is substantially the same, the steps are not required to be executed in the exact order shown in FIG. 5. The video coding method may be briefly summarized as below.

Step 500: Start.

Step 502: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 504: Check if pixel-based distortion should be used for coding parameter decision. If yes, go to step 506; otherwise, go to step 510.

Step 506: Calculate the pixel-based distortion based on at least a portion (i.e., part or all) of raw data of the source frame and at least a portion (i.e., part or all) of processed data derived from the raw data of the source frame.

Step 508: Refer to both of the evaluated visual quality and the calculated pixel-based distortion for deciding a target coding parameter (e.g., a motion vector set) associated with motion estimation in video coding. Go to step 512.

Step 510: Refer to the evaluated visual quality for deciding a target coding parameter (e.g., a motion vector set) associated with motion estimation in video coding.

Step 512: End.

As a person skilled in the art can readily understand details of each step in FIG. 5 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video coding method, comprising:
evaluating, using a processing circuit, visual quality associated with a first set of candidate motion vectors for a current block based on processed data in a coding loop for the current block;
evaluating, using the processing circuit, pixel-based distortion values associated with a second set of candidate motion vectors for the current block; and
performing motion estimation for the current block based on the evaluated visual quality and the evaluated pixel-based distortion values, wherein
when the evaluating visual quality is performed before the evaluating pixel-based distortion values, the second set of candidate motion vectors is selected from the first set of candidate motion vectors based on the evaluated visual quality, and
when the evaluating pixel-based distortion values is performed before the evaluating visual quality, the first set of candidate motion vectors is selected from the second set of candidate motion vectors based on the evaluated pixel-based distortion values.

2. The video coding method of claim 1, wherein the processed data includes transformed coefficients, quantized coefficients, reconstructed pixel data, motion-compensated pixel data, or intra-predicted pixel data.

3. The video coding method of claim 1, wherein
the evaluated visual quality is derived from checking at least one image characteristic that affects human visual perception, and
the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

4. The video coding method of claim 1, wherein the evaluating the visual quality comprises:
calculating, for a particular one of the first set of candidate motion vectors, a single visual quality metric according to the processed data in the coding loop; and
determining, for the particular one of the first set of candidate motion vectors, corresponding evaluated visual quality solely based on the single visual quality metric.

5. The video coding method of claim 1, wherein the evaluating the visual quality comprises:
calculating, for a particular one of the first set of candidate motion vectors, a plurality of distinct visual quality metrics according to the processed data in the coding loop; and
determining, for the particular one of the first set of candidate motion vectors, corresponding evaluated visual quality based on the distinct visual quality metrics.

6. The video coding method of claim 5, wherein the determining, for the particular one of the first set of candidate motion vectors, corresponding evaluated visual quality based on the distinct visual quality metrics comprises:
determining a plurality of weighting factors; and
determining the corresponding evaluated visual quality by combining the distinct visual quality metrics according to the weighting factors.

7. The video coding method of claim 6, wherein the weighting factors are determined by training.

8. The video coding method of claim 1, wherein the performing the motion estimation comprises:
determine at least one motion vector for the current block based on the second set of candidate motion vectors when the evaluating visual quality is performed before the evaluating pixel-based distortion values and
based on the first set of candidate motion vectors when the evaluating pixel-based distortion values is performed before the evaluating visual quality.

9. A video coding method, comprising:
evaluating, using a processing circuit, visual quality associated with a first set of candidate motion vectors for a current block based on processed data in a coding loop for the current block;
evaluating, using the processing circuit, pixel-based distortion values associated with a second set of candidate motion vectors for the current block; and
determining a target coding parameter associated with motion estimation for the current block based on the evaluated visual quality and the evaluated pixel-based distortion values, wherein
when the evaluating visual quality is performed before the evaluating pixel-based distortion values, the second set of candidate motion vectors is selected from the first set of candidate motion vectors based on the evaluated visual quality, and
when the evaluating pixel-based distortion values is performed before the evaluating visual quality, the first set of candidate motion vectors is selected from the second set of candidate motion vectors based on the evaluated pixel-based distortion values.

10. The video coding method of claim 9, wherein the target coding parameter is included in a bitstream generated by encoding the current block.

11. The video coding method of claim 9, wherein the processed data includes transformed coefficients, quantized coefficients, reconstructed pixel data, motion-compensated pixel data, or intra-predicted pixel data.

12. The video coding method of claim 9, wherein
the evaluated visual quality is derived from checking at least one image characteristic that affects human visual perception, and
the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

13. The video coding method of claim 9, wherein the evaluating the visual quality comprises:
calculating, for a particular one of the first set of candidate motion vectors, a single visual quality metric according to the processed data in the coding loop; and
determining, for the particular one of the first set of candidate motion vectors, corresponding evaluated visual quality solely based on the single visual quality metric.

14. The video coding method of claim 9, wherein the evaluating the visual quality comprises:
calculating, for a particular one of the first set of candidate motion vectors, a plurality of distinct visual quality metrics according to the processed data in the coding loop; and
determining, for the particular one of the first set of candidate motion vectors, corresponding evaluated visual quality based on the distinct visual quality metrics.

15. The video coding method of claim 14, wherein the determining, for the particular one of the first set of candidate motion vectors, corresponding evaluated visual quality based on the distinct visual quality metrics comprises:
  determining a plurality of weighting factors; and
  determining the corresponding evaluated visual quality by combining the distinct visual quality metrics according to the weighting factors.

16. The video coding method of claim 15, wherein the weighting factors are determined by training.

17. The video coding method of claim 9, wherein the target coding parameter is a motion vector set.

18. A video coding apparatus, comprising:
  a processing circuit configured to:
    evaluate visual quality associated with a first set of candidate motion vectors for a current block based on processed data in a coding loop for the current block;
    evaluate pixel-based distortion values associated with a second set of candidate motion vectors for the current block; and
    perform motion estimation for the current block based on the evaluated visual quality and the evaluated pixel-based distortion values, wherein
  when the processing circuit is configured to evaluate the visual quality and subsequently evaluate the pixel-based distortion values, the second set of candidate motion vectors is selected from the first set of candidate motion vectors based on the evaluated visual quality, and
  when the processing circuit is configured to evaluate the pixel-based distortion values and subsequently evaluate the visual quality, the first set of candidate motion vectors is selected from the second set of candidate motion vectors based on the evaluated pixel-based distortion values.

19. A video coding apparatus, comprising:
  a processing circuit configured to:
    evaluate visual quality associated with a first set of candidate motion vectors for a current block based on processed data in a coding loop for the current block;
    evaluate pixel-based distortion values associated with a second set of candidate motion vectors for the current block; and
    determine a target coding parameter associated with motion estimation for the current block based on the evaluated visual quality and the evaluated pixel-based distortion values, wherein
  when the processing circuit is configured to evaluate the visual quality and subsequently evaluate the pixel-based distortion values, the second set of candidate motion vectors is selected from the first set of candidate motion vectors based on the evaluated visual quality, and
  when the processing circuit is configured to evaluate the pixel-based distortion values and subsequently evaluate the visual quality, the first set of candidate motion vectors is selected from the second set of candidate motion vectors based on the evaluated pixel-based distortion values.

20. The video coding apparatus of claim 18, wherein the processing circuit is configured to:
  determine at least one motion vector for the current block
  based on the second set of candidate motion vectors when the processing circuit is configured to evaluate the visual quality and subsequently evaluate the pixel-based distortion values and
  based on the first set of candidate motion vectors when the processing circuit is configured to evaluate the pixel-based distortion values and subsequently evaluate the visual quality.

21. The video coding apparatus of claim 19, wherein
  the target coding parameter is a motion vector set; and
  the processing circuit is configured to determine motion vector set
  based on the second set of candidate motion vectors when the processing circuit is configured to evaluate the visual quality and subsequently evaluate the pixel-based distortion values and
  based on the first set of candidate motion vectors when the processing circuit is configured to evaluate the pixel-based distortion values and subsequently evaluate the visual quality.

* * * * *